United States Patent
Rajani et al.

(10) Patent No.: US 12,393,715 B2
(45) Date of Patent: Aug. 19, 2025

(54) ACCESS CONTROL FOR CLOUD-SHARED FILES FROM A STORAGE DEVICE

(71) Applicant: Sandisk Technologies, Inc., Milpitas, CA (US)

(72) Inventors: Ankit Rajani, Bangalore (IN); Puspanjali Panda, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 101 days.

(21) Appl. No.: 18/449,646

(22) Filed: Aug. 14, 2023

(65) Prior Publication Data
US 2024/0427920 A1  Dec. 26, 2024

Related U.S. Application Data

(60) Provisional application No. 63/522,104, filed on Jun. 20, 2023.

(51) Int. Cl.
| | |
|---|---|
| *G06F 21/62* | (2013.01) |
| *G06F 13/38* | (2006.01) |
| *G06F 13/42* | (2006.01) |
| *G06K 19/06* | (2006.01) |

(52) U.S. Cl.
CPC ........ *G06F 21/6218* (2013.01); *G06F 13/382* (2013.01); *G06F 13/4282* (2013.01); *G06K 19/06037* (2013.01); *G06F 2213/0042* (2013.01)

(58) Field of Classification Search
CPC .............. G06F 21/6218; G06F 13/382; G06F 13/4282; G06K 19/06037
See application file for complete search history.

(56) References Cited

U.S. PATENT DOCUMENTS

| | | |
|---|---|---|
| 9,378,386 B1 | 6/2016 | Saylor et al. |
| 9,565,175 B1 * | 2/2017 | Saylor ..................... H04L 67/56 |
| 2010/0010998 A1 * | 1/2010 | Wagner ............... G06F 21/6209 |
| | | 707/E17.01 |

(Continued)

OTHER PUBLICATIONS https://support.google.com/docs/answer/6211862?hl=en&co=GENIE.Platform%3DDesktop, as copied on Jun. 6, 2023 by the Internet Archive (https://web.archive.org/).

(Continued)

*Primary Examiner* — Clayton R Williams
(74) *Attorney, Agent, or Firm* — PATTERSON + SHERIDAN, LLP

(57) ABSTRACT

A host system is configured to upload data files to a cloud system and provide another layer of security to the access controls provided by the cloud system. The host system includes a communication interface for communicating with a storage device and a network interface for communicating with a the cloud system. The host system includes a processors configured to obtain a 2D barcode based on an identifier of the storage device and a network address of an authorizing device associated with an owner of the storage device. The processor is further configured to, responsive to a request to upload a data file to the cloud system, embed the 2D barcode into the data file (the 2D barcode configured to cause a client device attempting to access the data file to send an access request to the authorizing device) and transmit the data file to the cloud system.

20 Claims, 4 Drawing Sheets

(56) References Cited

U.S. PATENT DOCUMENTS

| | | | |
|---|---|---|---|
| 2014/0164534 A1* | 6/2014 | Fushman | H04L 67/06 |
| | | | 709/206 |
| 2022/0035933 A1* | 2/2022 | Qiao | G06F 16/168 |
| 2023/0023647 A1* | 1/2023 | Voss | H04L 9/0838 |

OTHER PUBLICATIONS

Vall; Create a QR Code for a Google Form: Scan & Collect Responses; Aug. 10, 2023; https://www.qrcode-tiger.com/how-to-make-a-qr-code-for-a-google-form; 8 pages.

Western Digital; New Personal Storage Solutions from Western Digital Put Consumers in Control of Their Digital Content; Jan. 7, 2019; https://www.westerndigital.com/company/newsroom/press-releases/2019/2019-01-07-new-personal-storage-solutions-from-western-digital-put-consumers-in-control-of-their-digital-content; 6 pages.

Dong Ngo; WD Makes Portable Storage Interesting Again at CES 2019; Jan. 7, 2019; https://dongknows.com/wd-makes-portable-storage-interesting-again/; 6 pages.

Gaurav Shukla; CES 2019: SanDisk Extreme Pro Portable SSD, 4TB USB-C Thumb Drive Prototype Showcased by Western Digital; Jan. 10, 2019; https://www.gadgets360.com/laptops/news/ces-2019-sandisk-extreme-pro-portable-ssd-4tb-usb-c-thumb-drive-prototype-showcased-by-western-digit-1974916; 2 pages.

* cited by examiner

ACCESS CONTROL FOR CLOUD-SHARED FILES FROM A STORAGE DEVICE

CROSS-REFERENCE TO RELATED APPLICATIONS

The present application claims priority to U.S. Provisional Patent Application Ser. No. 63/522,104, filed Jun. 20, 2023, entitled ACCESS CONTROL FOR CLOUD-SHARED FILES FROM A STORAGE DEVICE, the disclosure of which is hereby incorporated by reference in its entirety.

BACKGROUND

Field

This disclosure relates to securely sharing files uploaded from storage devices. More particularly, the disclosure relates to devices and methods for using two-dimensional (2D) barcodes to request access authorization.

Description of Related Art

Cloud storage systems enable the sharing of data files across multiple users. These cloud storage systems implement several security measures to protect files from unauthorized access.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Cloud storage systems employ multiple layers of security measures to protect user files and ensure their confidentiality, integrity, and availability. One of the primary methods used is encryption. Cloud storage providers utilize encryption algorithms to convert user files into an unreadable format, ensuring that even if unauthorized individuals gain access to the data, they cannot decipher it without the decryption key. Encryption is applied both during data transmission, using protocols like Transport Layer Security (TLS), and at rest, when the files are stored on the cloud servers.

Access control is another aspect of cloud storage security. Providers implement access control mechanisms to manage user permissions and ensure that only authorized individuals can access specific files or folders. This typically involves authentication methods such as passwords, two-factor authentication (2FA), and access tokens.

However, if an unauthorized individual obtains a user's login and password, they may be able to access that user's files. As the unauthorized individual has the credentials known by the cloud storage system, the unauthorized individual is able to bypass the cloud storage system's security measures.

One possible way to add more security is to add another security measure that is separate from the security measures implemented by the cloud storage system. In some embodiments, a two-dimensional barcode is embedded or otherwise associated with each file uploaded from a storage device by a host system. When a user downloads the file, the 2D barcode directs the user to seek permission from the file owner for access to the file. In some implementations, the file may be encrypted, password protected, or otherwise locked such that the user cannot access the file until they gain authorization to access the file from the file owner. As this authorization is in addition to the security measures implemented by the cloud storage system, an unauthorized individual would still be unable to access the file even after obtaining the file from the cloud storage system.

File Protection Using Barcodes

Figure 1:
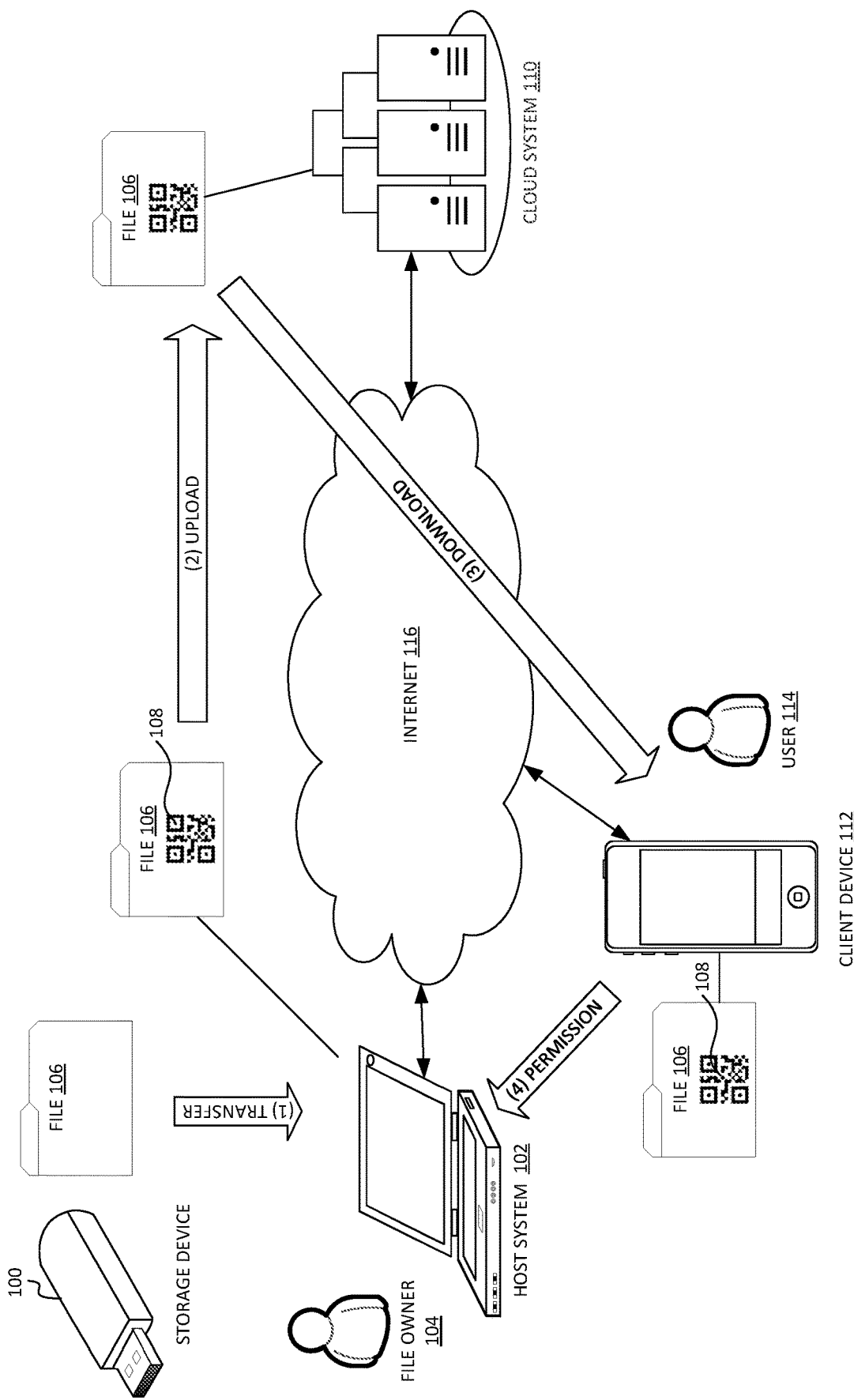
FIG. 1 is a diagram illustrating a transfer and access authorization of a data file from a storage device, to a host system, to a cloud system, and then to a client device, according to certain embodiments.

FIG. 1 is a diagram illustrating a transfer and access authorization of a data file 106 from a storage device 100, to a host system 102, to a cloud system 110, and then to a client device 112, according to certain embodiments. As the data file 106 is transferred from the storage device 100 to the host system 102, a 2D barcode is added that redirects the client device 112 to seek permission from the host system 102 when the client device 112 attempts to access the data file 106.

The following describes one possible scenario for uploading and accessing the data file 106. As will be apparent, other scenarios are possible, with operations happening in different order, with additional users, additional storage devices, additional client devices, and/or different data flows.

In one scenario, a file owner 104 stores one or more data files, including the data file 106, in the storage device 100. The storage device 100 may be an internal drive or an external drive. For example, the data storage device 100 may be internal drive that is connected to an internal bus of the host system 102, such as nonvolatile memory express (NVMe), serial ATA (SATA), or the like. In these examples, the internal storage drive is installed within a chassis of the host system 102, connected to the data interface, and connected to a power source of the host system, as internal drives do not have an internal power source, such as a battery. In another example, the storage device 100 is an external drive in a separate enclosure from the host system 102 and connected to a data interface of the host system by a cable or directly to a port of the host system. The data interface may a universal serial bus (USB) port on the host system, connected by a USB cable to another USB port on the data storage device 100. Other types of data interfaces can also be used, such as Lightning, Thunderbolt, external serial ATA (eSATA), or the like.

Typically, an internal drive or an external drive does not have its own connection to the Internet 116 or other wide area network and thus needs to be connected to the host system 102 for files to be uploaded to the cloud system 110. After the storage device 100 is connected to the host system 102, the data file 106 is transferred to the host system 102.

The host system 102 may be a computer, laptop, mobile device, or the like that is being used by the file owner 104 to upload files. The host system 102 may be owned by the file owner 104 or may be a device being used by the file owner 104, such as a work computer or library computer. When uploading the data file 106, the host system 102 can obtain a 2D barcode and embed the 2D barcode 108 with the file 106. For example, the 2D barcode 108 may be stored as meta data for the file 106.

In some embodiments, the 2D barcode 108 and the file 106 may be combined together in a container file. The container file may, for example, have a file extension associated with image files so that an image program on the client device 112 that can interpret barcode images is used to open the file 106. The container may even use the structure of an image file, with the 2D barcode 108 stored as a thumbnail with the file contents stored in the payload. The payload may be encrypted or otherwise locked, while the 2D barcode 108 is readable, such that the image program on the client device 112 can read the 2D barcode 108, but not the file contents. Other ways of combining the 2D barcode 108 with the data file 106 may also be used.

2D barcodes, also known as matrix barcodes, are a type of barcode that is capable of encoding data in both the horizontal and vertical dimensions, enabling a larger data capacity. In some embodiments, the structure of a 2D barcode consists of various geometric patterns, such as squares, dots, or hexagons, arranged in a grid-like formation. Each pattern within the barcode can represent a specific binary value or data element. 2D barcodes can store a wide range of data types. This can include text, numbers, URLs, contact information, or even multimedia content such as images or videos. One type of 2D barcode is a quick response (QR) code. A QR code is a 2D barcode that consists of black squares arranged on a white background.

A barcode reader or scanner can use imaging technology to capture and interpret the 2D barcode. When a 2D barcode is scanned, the barcode reader captures the image of the barcode using a built-in camera or optical sensor. The software then processes the image to decode the patterns and extract the encoded data. The decoding process involves analyzing the arrangement of patterns, their sizes, orientations, and colors to reconstruct the information stored in the barcode.

The storage device 100 may include a program, such as a barcode manager, that generates or otherwise provides a barcode. The host system 102 may run the program to generate a unique barcode based on a device identifier, serial number or the like of the data storage device 100. The unique barcode may also include a pattern representing a network address of an authorizing device associated the file owner 104. In some implementations, the network address may be for an Internet accessible proxy server associated with the authorizing device that can forward messages to the authorizing device. The authorizing device can be a computing device that can receive authorization requests directed to the file owner 104. For example, if the host system 102 is owned by the file owner 104, the host system 102 may be set as the authorizing device.

The data file 106 with the embedded barcode 108 is then uploaded by the host system 102 to the cloud system 110. The cloud system 110 can then store the file 106 in an account associated with the file owner 104. Various security measures may be used by the cloud system 110 to protect the file 106 from unauthorized access. However, users that are given permission to download the file 106 by the file owner 104 or otherwise obtain such permission can download the file 106 from the cloud system 110.

In the example scenario, a user 114 operating a client device 112 downloads the file 106 from the cloud system 110. In some implementations, the file 106 is locked (e.g., encrypted, password protected, and/or the like) and the client device 112 cannot read the contents of the file. When the user 114 attempts to read the file 106, the barcode 108 is presented to the user 114. The client device 112 then reads the barcode 108. In this scenario, the 2D barcode includes the network address of the host system 102, which is the authorizing device for the file owner 104. The client device 112 is then directed to send an authorization request to the host system 102 to get permission to read the file 106.

The host system 102 then receives the authorization request from the client device 112. The host system 102 then presents the request to the file owner 104 and requests a decision from the file owner 104 on whether to grant or deny permission to the user 114.

Figure 2:
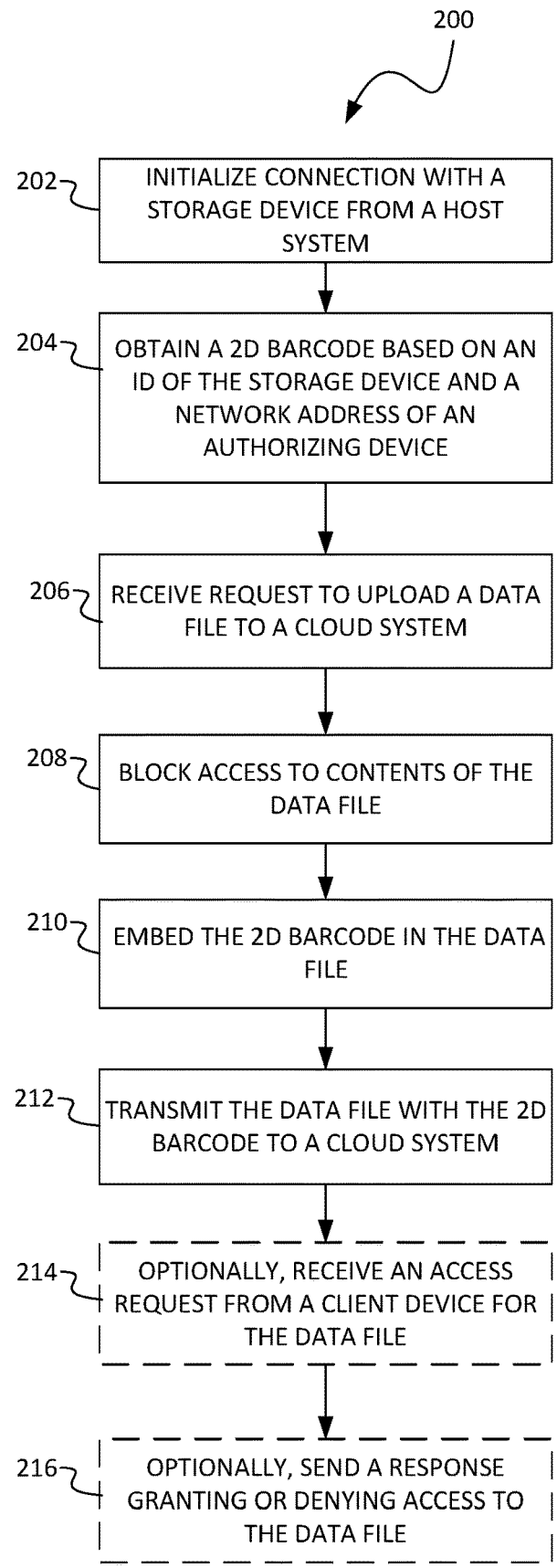
FIG. 2 illustrates a block diagram representing an upload process to a cloud system that adds another layer of security, according to certain embodiments.

FIG. 2 illustrates a block diagram representing an upload process 200 to a cloud system that adds another layer of security, according to certain embodiments. For ease of reference, the following discusses the upload process in reference to the host system 102, data storage device 100, and other elements of FIG. 1, though it can be performed by other embodiments. Furthermore, the process may be performed by the host system 102 or one of its components, such as control circuitry or a processor.

At block 202, the host system 102 initializes a connection with a data storage device 100. Prior to this, the data storage device 100 may be connected by the file owner 104 to a data interface of the host system 102. The data interface may a USB port on the host system, directly connected port-to-port or indirectly connected by a USB cable to another USB port on the data storage device 100. Other types of data interfaces can also be used, such as Lightning, Thunderbolt, external serial ATA (eSATA), Secure Digital (SD) reader, microSD reader, or the like. In some examples, the data storage device 100 may be internal drive that is connected to an internal bus of the host system, such as NVMe, SATA, or the like. In these examples, the internal storage drive is installed within a chassis of the host system, connected to the data interface, and connected to a power source of the host system, as internal drives do not have an internal power source, such as a battery.

Initializing the connection may involve a handshake or other negotiation process. For example, USB devices utilize USB enumeration to establish a connection. USB enumeration is a process that takes place when a USB device is connected to a computer or other host system. Upon connection, the USB controller on the host system detects the device and establishes its power requirements. The controller then communicates with the device to determine its supported USB speed, such as USB 2.0 or USB 3.0. Next, the USB device provides its Vendor ID (VID) and Product ID (PID) to the host, which helps the operating system (OS) identify the device and locate the appropriate device drivers.

The OS then checks its driver database or datastore and either prompts the user for driver installation or automatically installs the necessary driver for the device. Such a driver may be configured to enable the performance boosting process 200 to be performed by the host system. Once the driver is loaded, the host OS configures the USB device by assigning resources and determining its capabilities. Endpoint allocation can then take place, where the host OS assigns logical channels (endpoints) for data transfer based on the device's defined interfaces. The OS notifies relevant applications or services about the connected device, enabling them to interact with the device using the appropriate Application Programming Interface (API). With the enumeration process complete, the USB device and the host computer are ready to exchange data through the allocated endpoints.

At block 204, the host system 102 obtains a 2D barcode based on an identifier of the storage device and a network address of an authorizing device associated with the file owner 104. The identifier may be a serial code, device identifier, PID, or other identifier that is unique to the device. In many scenarios, such as when the file owner 104 owns the host system 102, the authorizing device and the host system 102 are the same. In some situations, such as when the file owner 104 is using a public computer or a work computer, the authorizing device is another device that is owned by the file owner 104. The authorizing device may also be something more convenient for the file owner 104 to use, such as a mobile phone.

The network address of the authorizing device may be an Internet Protocol (IP) address, a cellular phone number, or other network-accessible address. In some scenarios, the authorizing device may not have a public IP address (e.g., on a home network using Network Address Translation) and may rely on a registration server, other third-party service, proxy server, virtual private network (VPN), reverse secure shell tunnelling, or similar technology to facilitate creating a connection between a client device and the authorizing device.

In one implementation, the storage device 100 includes a program or utility, such as a barcode manager, that generates a barcode when run. The barcode manager may include a user interface that enables entering in file owner 104 data, such as the identifier and/or the network address of the authorizing device. The barcode manager may be read from the storage device 100 and run by the host system 102. The barcode manager can then create a 2D barcode with the file owner 104 data.

At block 206, the host system 102 receives a request to upload a data file 106 to the cloud system 110. The cloud system 110 can be a publicly accessible cloud storage provider that enables users to share files with each other. The host system 102 includes a communication interface that provides access to the Internet 116, such as Wi-Fi, ethernet, cellular network or the like, that enables the host system 102 to communicate with the cloud system 110.

At block 208, the host system 102 blocks access to contents of the data file 106. Blocking access can be accomplished using encryption, password protection, or the like. As a result, the data file 106 cannot be accessed without the corresponding password or decryption key.

At block 210, the host system 102 embeds the 2D barcode in the data file. In one implementation, the barcode manager may also include the ability to embed the 2D barcode 108 into one or more files in the storage device 100 or to copies stored on the host system 102. For example, the 2D barcode 108 may be added to all the files in the storage device 100 or some of the files, such as those being transferred. In one implementation, the file owner 104 selects which files to embed the 2D barcode in. The barcode manager may also create container files that hold both the data file 106 and the 2D barcode 108.

At block 212, the host system 102 transmits the data file 106 with the 2D barcode to the cloud system 110. For example, the host system 102 may transmit the data file 106 over the Internet 116 or other wide area network. In some scenarios, such as when the authorizing device is different from the host system 102, the process 200 then ends. In other scenarios, such as when the authorizing device and the host system 102 are the same, the process 200 continues to block 214.

At block 214, the host system 102 optionally receives an access request from a client device 112 for the data file 106. The client device 112 may have previously obtained the data file 106 from the cloud system 110. However, as access to the data file 106 is blocked, the client device 112 is unable to read the contents of the file. Instead, opening the data file 106 causes the 2D barcode 108 to be read. As image files are usually associated by the OS with image viewer programs, reading the 2D barcode 108 can cause an image viewer to open in the client device 112. Many image viewer programs have built-in support for interpreting 2D barcodes, such as QR codes. Reading the 2D code can cause the image viewer program to generate an internet address that can be used by a web browser to send a message to the host system 102. The internet address may be based off of the network address data included in the 2D code. The internet address may enable the client device 112 to communicate with the host system 102 either directly or indirectly through a third party system. Furthermore, the image viewer may also display a message that can be included with the barcode, with the message providing instructions to the user 114 on how to request access to the data file 106 using the provided internet address.

In one implementation, the internet address opens a web form that includes fields for requesting information from the user 114 about the access request. For example, the web form may ask the user 114 their identify, their contact information, why they wish to access the data file 106, and/or other relevant information.

The host system 102 can then generate a prompt, notification, or other user interface screen notifying the file owner 104 of the access request sent by the client device 112. The user interface screen may be generated by the barcode manager running on the host system 102. The user interface screen can also provide the file owner 104 with any relevant information provided by the user 114, such as their identify and reason for requesting access. The file owner 104 may then use the user interface screen to select whether to grant or deny the request.

At block 216, the host system 102 optionally sends the response granting or denying access to the data file 106. If the file owner 104 decides to grant access, the host system 102 may also send the relevant password or decryption key to provide access to the file. The client device 112 would then be able to read the data file 106.

The process 200 may be repeated to upload additional data files. For example, the above process 200 can be performed for a second data file in the same fashion described earlier for the first data file 106. Typically, files from the same storage device 100 utilize the same 2D barcode 108. That is, different files from the same storage device 100 can be embedded with the same barcode. However, if the file owner 104 has a second storage device, a second 2D barcode may be generated for the second storage device that is different from the first 2D barcode 108. As the second storage device would have a different identifier than the first storage device 100, the 2D barcode generated would also be different. Data files uploaded from the second storage device would use the second 2D barcode.

As different storage devices are associated with different 2D barcodes, the identifiers associated with the storage device may be used to verify that the file owner 104 is the true rights holder of the data file 106. When receiving the access request, the barcode manager may require that the storage device 100 with the corresponding identifier to the data file 106 that the client device 112 is requesting access to is connected to the host system 102 to prove the file owner 104 has physical ownership of the storage device 100. This can add another layer of security to the process by ensuring that only the file owner 104 with physical access to the storage device 100 can approve access to the data file 106.

Figure 3:
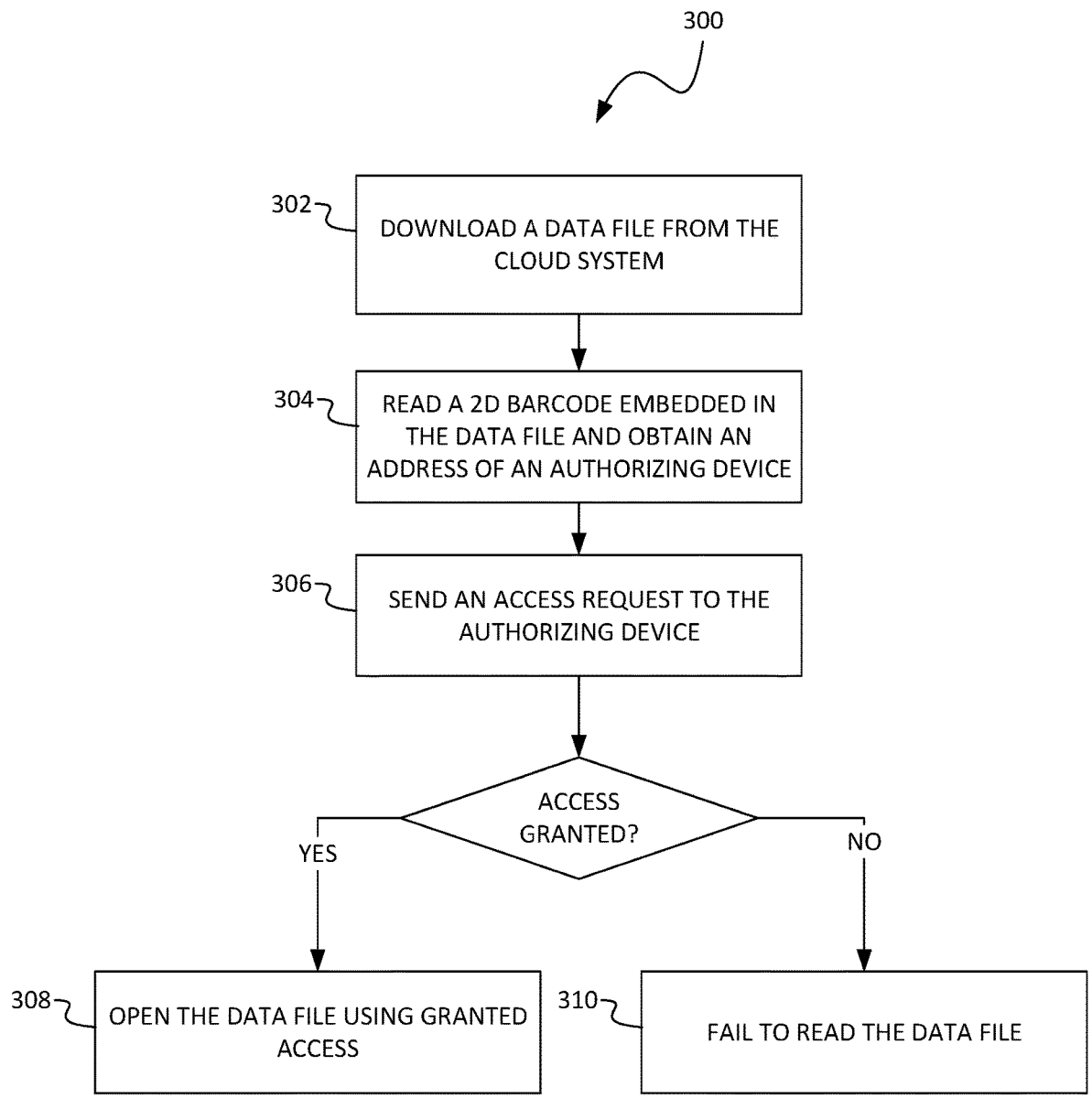
FIG. 3 illustrates a block diagram representing a download process to a cloud system that adds another layer of security, according to certain embodiments.

FIG. 3 illustrates a block diagram representing a download process 300 to a cloud system that adds another layer of security, according to certain embodiments. For ease of reference, the following discusses the upload process in reference to the host system 102, data storage device 100, and other elements of FIG. 1, though it can be performed by other embodiments. Furthermore, the process may be performed by the client device 112 or one of its components, such as control circuitry or a processor.

At block 302, the client device 112 downloads the data file 106 from the cloud system 110. The client device 112 can access the cloud system 110 through a communication interface that provides access to the Internet 116, such as Wi-Fi, ethernet, cellular network or the like, that enables the client device 112 to communicate with the cloud system 110.

At block 304, the client device 112 reads the 2D barcode 108 embedded in the data file 106 and obtains an address of an authorizing device. The client device 112 may first attempt to open the file. However, as access to the data file 106 is blocked, the client device 112 is unable to read the contents of the data file 106. Instead, opening the data file 106 causes the 2D barcode 108 to be read, as well as any instruction messages that may be included with the 2D barcode 108. As discussed above, this can cause an image viewer to open in the client device 112. Reading the 2D code can cause the image viewer program to generate an internet address that can be used by a web browser to send an access request to the host system 102. The internet address may be based off of the network address data included in the 2D code. The internet address may enable the client device 112 to communicate with the host system 102 either directly or indirectly through a third party system.

At block 306, the client device 112 sends an access request to the authorizing device. In one implementation, entering the internet address into a browser causes a web form to display on the client device 112. The web form may be served by the authorizing device or a third-party service. The web form can include fields for requesting information from the user 114 about the access request. For example, the web form may ask the user 114 their identify, their contact information, why they wish to access the data file 106, and/or other relevant information. Once the web form is completed, the client device 112 can submit the entered data, causing an access request to be generated and sent to the authorizing device.

If access is granted by the authorizing device, the process 300 proceeds to block 308. The authorizing device may send a password or encryption key to provide access to the data file 106. The client device can then open the data file 106 using the granted access. The process 300 can then end.

If access is not granted by the authorizing device, the process 300 proceeds to block 310. As the client device 112 does not have the needed access to read the data file 106, the client device 112 fails to read the data file 106. The process 300 can then end.

Example Storage Device and Host System

Figure 4:
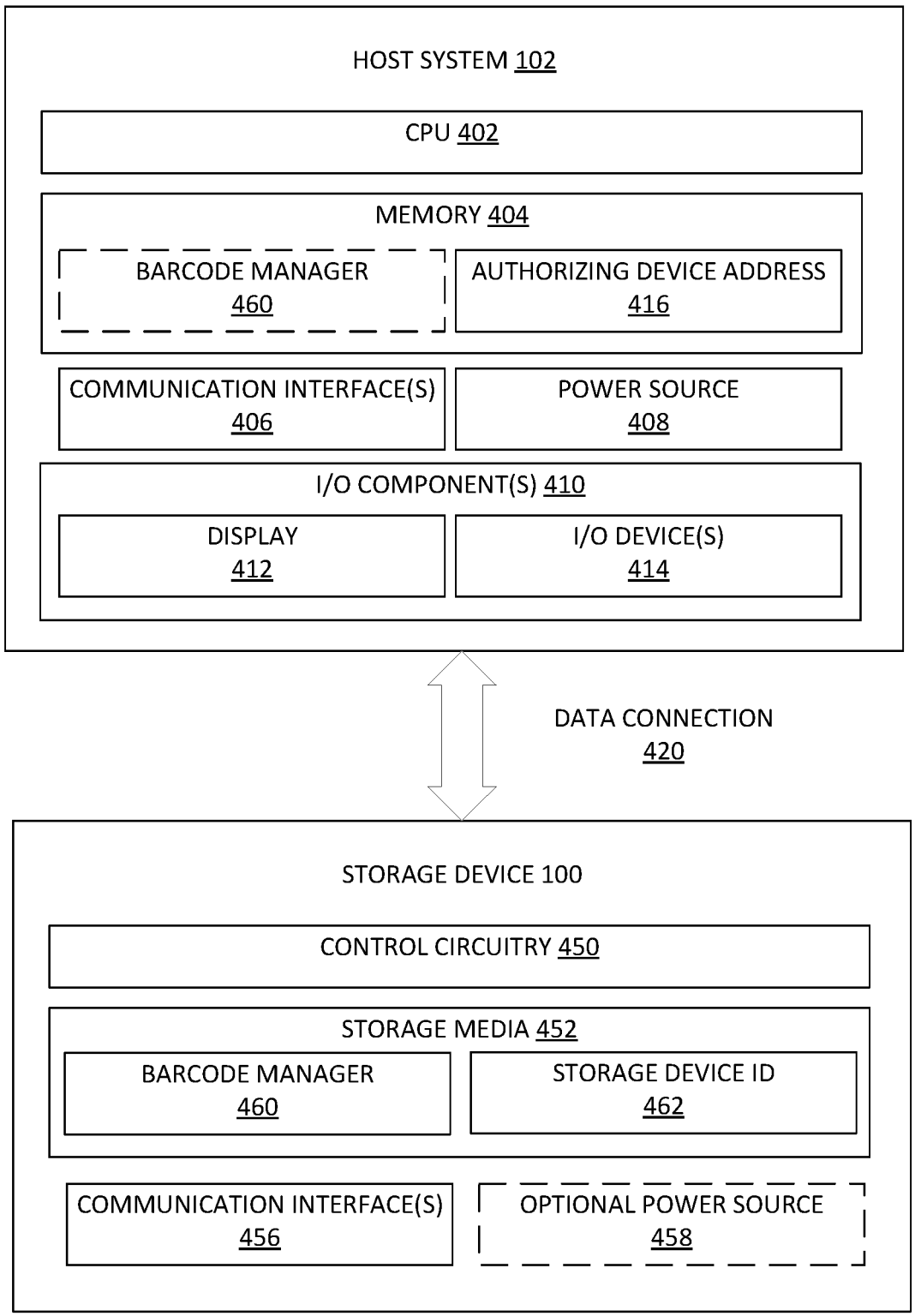
FIG. 4 illustrates a block diagram providing example details of the data storage device and the host system, according to certain embodiments.

FIG. 4 illustrates example details of the data storage device 100 and the host system 102, according to certain embodiments. As illustrated, the host system 102 can include one or more of the following components, devices, modules, and/or units (referred to herein as "components"), either separately/individually and/or in combination/collectively: one or more central processing units (CPUs) 402 or other type of processor, memory 404, one or more communication interfaces 406, a power source 408 (e.g., battery or power supply unit), and/or one or more I/O components 410.

In some embodiments, the host system 102 can comprise a housing/enclosure configured and/or dimensioned to house or contain at least part of one or more of the components of the host system 102. In some embodiments, the data storage device 100 may be housed internally in the enclosure of the host system 102. For example, the host system 102 may be a server or desktop system in case or rack mount enclosure with one or more storage drives in the case or enclosure. The data storage device 100 may also be an external drive that is connected to the host system 102 via an external port, such as USB. The data storage device 100 may also be an SD card, a microSD card, or another type of flash card that is readable from a memory reader of the host system 102

The memory 404 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 402 to quickly retrieve and manipulate the information it needs to perform tasks.

The memory 404 can include programs that are running on the host system 102, such as a barcode manager 460. The barcode manager 460 may be a program configured to generate barcodes for storage device, embed barcodes into data files, and/or process authorization requests send from client devices trying to open blocked files. In addition, the host system 102 may also include non-volatile memory for permanently storing data. For example, the data storage device 100 may be an internal drive that is installed within the host system 102 housing or the host system 102 may include a separate storage drive different from the data storage device 100. The memory 404 may also store relevant data, such as the authorizing device address 416. As discussed earlier, the authorizing device may be the same as the host system 102, but may also be a separate device.

The one or more communication interfaces 406 can be a data interface that includes connectors, cables, and/or protocols for connection, communication, and/or power supply between host systems and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 100, forming a data connection 420 with the data storage device 100.

The power source 408 can be configured to provide/manage power for the host system 102. The power source 408 can comprise one or more devices and/or circuitry configured to provide a source of power and/or provide power management functionality. Moreover, in some embodiments the power source 408 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 410 can include a variety of components to receive input and/or provide output. The one or more I/O components 410 can be configured to receive touch, speech, gesture, biometric data, or any other type of input. In examples, the one or more I/O components 410 can be used to provide input regarding control of the host system 102, such as opening files, entering logins, plays, and/or changing settings. As shown, the one or more I/O components 410 can include the one or more displays 412 configured to display data and various user interfaces. The display 412 can include one or more liquid-crystal displays (LCD), light-emitting diode (LED) displays, organic LED displays, plasma displays, electronic paper displays, and/or any other type(s) of technology. In some embodiments, the display 412 can include one or more touchscreens configured to receive input and/or display data. Further, the one or more I/O components 410 can include the one or more input/output devices 414, which can include a touchscreen, touch pad, controller, mouse, keyboard, wearable device (e.g., optical head-mounted display), virtual or augmented reality device (e.g., head-mounted display), etc.

As illustrated, the data storage device 100 can include one or more of the following components, devices, modules, and/or units (referred to herein as "components"), either separately/individually and/or in combination/collectively: control circuitry 450, storage media 452, communication interfaces 456, and/or optionally a power source 458 (e.g., battery or power supply unit). In some embodiments, the data storage device 100 can comprise a housing/enclosure configured and/or dimensioned to house or contain the components of the data storage device 100.

The data storage device 100 may be a solid-state drive (SSD), Secure Digital (SD) card, flash drive, or a USB memory stick that uses semiconductor memory as the storage media. In other implementations, the data storage may be a hard disk drive (HDD) that uses magnetic disks as the storage media or a solid-state hybrid drive (SSHD) that uses a combination of semiconductor memory and magnetic disk technology. The data storage device 100 may also be a tape drive.

Although certain components of the data storage device 100 and host system 102 are illustrated in FIG. 4, it should be understood that additional components not shown can be included in embodiments in accordance with the present disclosure. Furthermore, certain of the illustrated components can be omitted in some embodiments. Although the control circuitry 450 is illustrated as a separate component, it should be understood that any or all of the remaining components of the data storage device 100 can be embodied at least in part in the control circuitry 450. That is, the control circuitry 450 can include various devices (active and/or passive), semiconductor materials and/or areas, layers, regions, and/or portions thereof, conductors, leads, vias, connections, and/or the like, wherein one or more of the other components of the data storage device 100 and/or portion(s) thereof can be formed and/or embodied at least in part in/by such circuitry components/devices.

The various components of the data storage device 100 can be electrically and/or communicatively coupled using certain connectivity circuitry/devices/features, which can or may not be part of the control circuitry 450. For example, the connectivity feature(s) can include one or more printed circuit boards configured to facilitate mounting and/or interconnectivity of at least some of the various components/circuitry of the data storage device 100. In some embodiments, two or more of the control circuitry 450, the storage media 452, the communication interface(s) 456, and/or the power source 458, can be electrically and/or communicatively coupled to each other.

The storage media 452 can utilize various types of non-volatile memory (NVM) to permanently store data. NVM is a type of computer memory that can retain stored information even after power is removed. For example, the storage media 452 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

Programs such as the barcode manager 460 may be stored in the storage media 452. Other data, such as the storage device identifier (ID) 462 or device serial number can also be stored in the storage media 452 or other memory of the storage device 100.

The one or more communication interfaces 456 can be configured to communicate with one or more device/sensors/systems. For example, the one or more communication interfaces 456 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 456 can be a data interface that includes connectors, cables, and/or protocols for connection, communication, and/or power supply between the host system 102 and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 102, forming the data connection 420.

The optional power source 458 can be configured to provide/manage power for the data storage device 100. In some embodiments, the power source can include one or more batteries, such as a lithium-based battery, a lead-acid battery, an alkaline battery, and/or another type of battery. In some embodiments the power source 458 includes a mains power connector that is configured to couple to an alternating current (AC) or direct current (DC) mains power source. However, in some embodiments, the data storage device 100 may not include an internal power source but be configured to receive power through the communication interface 456, such as via a USB connection.

The term "control circuitry" is used herein according to its broad and ordinary meaning, and can refer to any collection of one or more processors, processing circuitry, processing modules/units, chips, dies (e.g., semiconductor dies including come or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry can further comprise one or more storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

Additional Embodiments

Those skilled in the art will appreciate that in some embodiments, other types of storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A host system for uploading data files to a cloud system, the host system comprising:
   a communication interface configured to communicate with a first storage device;
   a network interface configure to communicate with the cloud system; and
   one or more processors configured to:
   obtain a two-dimensional (2D) barcode based on an identifier of the first storage device and a network address of an authorizing device associated with an owner of the first storage device; and
   in response to a request to upload a first data file from the first storage device to the cloud system:
   embed the 2D barcode into the first data file, the 2D barcode configured to cause a client device attempting to access the first data file to send an access request to the authorizing device; and
   transmit the first data file to the cloud system.

2. The host system of claim 1, the one or more processors further configured to:
  generate a second 2D barcode based on a second identifier of a second storage device and a second network address of a second authorizing device associated with a second owner of the second storage device; and
  in response to a request to upload a second file from the second storage device to the cloud system:
    embed the second 2D barcode into the second file, the second 2D barcode configured to cause a second client device attempting to access the second file to send an access request to the second authorizing device; and
    transmit the second file to the cloud system.

3. The host system of claim 1, wherein the authorizing device is the host system.

4. The host system of claim 3, wherein the host system is further configured to:
  in response to receiving the access request from the client device, provide a notification to the owner of the first storage device of the access request; and
  grant or deny the access request based on a response by the owner to the notification.

5. The host system of claim 1, wherein the 2D barcode comprises a QR code.

6. The host system of claim 1, wherein the 2D barcode is further configured to direct the client device to a web form that requests an identify of a user of the client device and a reason of the user for accessing the first data file.

7. The host system of claim 1, wherein the first data file is encrypted or locked and the authorizing device is configured to provide an access key or password to the first data file responsive to granting the access request.

8. The host system of claim 1, wherein the 2D barcode is generated by the first storage device and provided to the host system.

9. The host system of claim 1, wherein the 2D barcode is generated by the host system.

10. The host system of claim 1, wherein the communication interface is a universal serial bus (USB) port and the first storage device is a USB external storage drive configured to physically connect to the USB port of the host system.

11. The host system of claim 1, wherein the first storage device is an internal storage drive and the communication interface is a computer bus.

12. The host system of claim 1, wherein the identifier of the first storage device comprises at least one of a device identifier and a serial number.

13. A method for controlling access to data files shared over a network, the method comprising:
  obtaining, on a host system, a two-dimensional (2D) barcode based on an identifier of a first storage device and a network address of an authorizing device associated with an owner of the first storage device; and
  in response to a request, received on the host system, to upload a first data file from the first storage device to a cloud system:
    embedding the 2D barcode into the first data file, the embedded 2D barcode configured to cause a client device attempting to access the first data file to send an access request to the authorizing device; and
    transmitting the first data file to the cloud system.

14. The method of claim 13, further comprising:
  generating a second 2D barcode based on a second identifier of a second storage device and a second network address of a second authorizing device associated with a second owner of the second storage device; and
  in response to a request to upload a second file from the second storage device to the cloud system:
    embedding the second 2D barcode into the second file, the second 2D barcode configured to cause a second client device attempting to access the second file to send an access request to the second authorizing device; and
    transmitting the second file to the cloud system.

15. The method of claim 13, wherein the authorizing device is the host system.

16. The method of claim 15, further comprising:
  in response to receiving the access request from the client device, providing a notification to the owner of the first storage device of the access request; and
  granting or denying the access request based on a response by the owner to the notification.

17. The method of claim 13, wherein the 2D barcode comprises a QR code.

18. The method of claim 13, wherein reading the 2D barcode further directs the client device to a web form that requests an identify of a user of the client device and a reason of the user for accessing the first data file.

19. The method of claim 13, wherein the first data file is encrypted or locked and the authorizing device is configured to provide an access key to the first data file responsive to granting the access request.

20. A host system for uploading data files to a cloud system, the host system comprising:
  means for obtaining data files from a first storage device;
  means for transmitting data files to the cloud system; and
  one or more processors configured to:
    obtain a two-dimensional (2D) barcode based on an identifier of the first storage device and a network address of an authorizing device associated with an owner of the first storage device; and
    in response to a request to upload a first data file from the first storage device to the cloud system:
      embed the 2D barcode into the first data file, the 2D barcode configured to cause a client device attempting to access the first data file to send an access request to the authorizing device; and
      transmit the first data file to the cloud system.

* * * * *